(12) United States Patent
Stevens et al.

(10) Patent No.: US 12,096,236 B2
(45) Date of Patent: *Sep. 17, 2024

(54) SYSTEM AND METHOD FOR RADIO FREQUENCY (RF) NETWORK DESIGN WITH DATA INTAKE TOOL

(71) Applicant: DISH Wireless L.L.C., Englewood, CO (US)

(72) Inventors: John Stevens, Englewood, CO (US); Amanda Louie, Englewood, CO (US); Jon Crofford, Englewood, CO (US); Troy Bailey, Englewood, CO (US); Mark McGarey, Englewood, CO (US); Brad Cole, Englewood, CO (US); Kevin Black, Englewood, CO (US); Zane Edwards, Englewood, CO (US); Michael Frishman, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,199

(22) Filed: Sep. 28, 2023

(65) Prior Publication Data

US 2024/0031821 A1    Jan. 25, 2024

Related U.S. Application Data

(63) Continuation of application No. 17/445,350, filed on Aug. 18, 2021, now Pat. No. 11,792,655.

(60) Provisional application No. 63/067,610, filed on Aug. 19, 2020.

(51) Int. Cl.
*H04W 16/18* (2009.01)
*H04B 17/336* (2015.01)
*H04B 17/382* (2015.01)
*H04L 41/14* (2022.01)
*H04W 24/02* (2009.01)

(52) U.S. Cl.
CPC .......... *H04W 16/18* (2013.01); *H04B 17/336* (2015.01); *H04B 17/382* (2015.01); *H04L 41/145* (2013.01); *H04W 24/02* (2013.01)

(58) Field of Classification Search
CPC ............................ H04W 16/18; H04L 41/145
See application file for complete search history.

(56) References Cited

U.S. PATENT DOCUMENTS

2006/0293965 A1* 12/2006 Burton ............... G06Q 30/0623
                                                                    705/26.81
2017/0105126 A1*  4/2017 Liu ....................... H04W 24/02

* cited by examiner

*Primary Examiner* — Samina F Choudhry
(74) *Attorney, Agent, or Firm* — KW Law, LLP (57) ABSTRACT

Systems, devices and processes are provided to improve the design and implementation of radio frequency (RF) communication networks. Specifically, these various embodiments improve the likelihood of a successful RF network design by identifying and preferentially utilizing RF transmission sites having a relatively high probability of being successfully incorporated into the RF network. These various embodiments provide a site qualification database that includes site data for a plurality of RF transmission sites. When so implemented, the site qualification database is utilized to analyze the site data and generate a plurality of site scores for the corresponding RF transmission site, which can then be utilized in an RF analysis.

20 Claims, 8 Drawing Sheets

SYSTEM AND METHOD FOR RADIO FREQUENCY (RF) NETWORK DESIGN WITH DATA INTAKE TOOL

PRIORITY CLAIM

This application is a continuation of U.S. Nonprovisional application Ser. No. 17/445,350 filed Aug. 18, 2021 and claims priority to U.S. Provisional Application Ser. No. 63/067,610 filed Aug. 19, 2020, both of which are hereby incorporated by reference.

TECHNICAL FIELD

The following discussion generally relates to radio frequency networks. More particularly, the following discussion relates to designing radio frequency networks.

BACKGROUND

Wireless communication is an increasingly important component of modern life. For example, wireless data transfer is now being used for a wide variety of business and entertainment activity. This has resulted in an increasing need for improved wireless communication networks. For example, there is an increasing need for new networks with faster transmission rates.

Unfortunately, the task of designing a building such wireless communication networks is increasing complex and costly. Thus, there is an increasing need for improved techniques for designing and building improved wireless communication networks. Other desirable features and characteristics will become apparent from the subsequent detailed description and the appended claims, taken in conjunction with the accompanying drawings and this background section.

BRIEF SUMMARY

The various embodiments described herein provide systems, devices and/or methods to improve the design of radio frequency (RF) communication networks. Specifically, these various embodiments improve the likelihood of a successful RF network design by identifying and preferentially utilizing RF transmission sites having a relatively high probability of being successfully incorporated into the RF network. These various embodiments provide a site qualification database that includes site data for a plurality of RF transmission sites. When so implemented, the site qualification database is utilized to analyze the site data and generate a plurality of site scores, with each of the plurality of site scores providing a viability metric for the corresponding RF transmission site. The plurality of site scores is then utilized in rating each of the plurality of RF transmission sites. These ratings of the RF transmission sites are then utilized in an RF analysis. Specifically, an RF analysis is performed to generate an RF network design utilizing the ratings to preferentially utilize RF transmission sites having a suitable site score.

In one example embodiment, In one example embodiment, a radio frequency (RF) network design method is provided, the RF network design method comprising: providing a site data intake tool to one or more RF transmission site vendors, the site data intake tool including an array of site data fields for receiving site data; receiving the site data intake tool from the one or more RF transmission site vendors, each received site data intake tool including a plurality of site data elements corresponding to a group of RF transmission sites available from a corresponding RF transmission site vendor; updating a site qualification database on a processing system with the received site data intake tools such that the site qualification database includes site data for each of a plurality of RF transmission sites; analyzing the site data in the site qualification database to generate a plurality of site scores, each of the plurality of site scores providing a viability metric for a corresponding one of the plurality of RF transmission sites; rating each of the plurality of RF transmission sites based at least in part on the plurality of site scores; and performing an RF analysis to generate an RF network design utilizing the rating of each of the plurality of RF transmission sites to preferentially utilize RF transmission sites having a suitable site score.

A further example may be implemented wherein the site data fields include fields for ownership data, regulatory data, tower structural data, transport data, and power data.

A further example may be implemented wherein the intake tool includes site data descriptors for the site data fields.

A further example may be implemented wherein the providing a site data intake tool to one or more RF transmission site vendors comprises providing a separate site data intake tool for transmission towers and rooftop transmission sites.

A further example may be implemented wherein the site data intake tool validates site data entered by an RF transmission site vendor.

A further example may be implemented wherein the site data intake tool validates site data entered by an RF transmission site vendor by enforcing a data type on the site data entered.

A further example may be implemented wherein the site data intake tool validates site data entered by an RF transmission site vendor by enforcing a data range on the site data entered.

A further example may be implemented wherein the analyzing the site data in the site qualification database to generate the plurality of site scores comprises differentially weighing different data types in the site data for each of the plurality of RF transmission sites.

A further example may be implemented wherein the rating each of the plurality of RF transmission sites is based at least in part on the plurality of site scores comprises comparing the each of the plurality of site scores to at least a first threshold value, and wherein the performing an RF analysis to generate an RF network design utilizing the rating of each of the plurality of RF transmission sites to preferentially utilize RF transmission sites having a suitable site score comprises preferentially utilizing RF transmission sites having a site score beyond the first threshold value.

A further example may be implemented wherein the rating each of the plurality of RF transmission sites is based at least in part on the plurality of site scores comprises comparing the each of the plurality of site scores to at least a first threshold value and at least a second threshold value and wherein the performing an RF analysis to generate an RF network design utilizing the rating of each of the plurality of RF transmission sites to preferentially utilize RF transmission sites having a suitable site score comprises preferentially utilizing RF transmission sites having a site score beyond the first threshold value and then utilizing RF transmission sites having a site score between the first threshold value and the second threshold value as needed.

In another example embodiment, a computer-implemented radio frequency (RF) network design method is provided, the RF network design method comprising: providing a site data intake tool to one or more RF transmission site vendors, the site data intake tool including an array of site data descriptors and site data fields for receiving site data, the site data fields including fields for ownership data, regulatory data, tower structural data, transport data, and power data; entering a plurality of site data elements into the site data fields for each of the one or more RF transmission site vendors; receiving the site data intake tool from the one or more RF transmission site vendors, each received site data intake tool including the plurality of site data elements corresponding to a group of RF transmission sites available from a corresponding RF transmission site vendor; updating a site qualification database on a processing system with the received site data intake tools such that the site qualification database includes site data for each of a plurality of RF transmission sites, where the site data includes ownership data, regulatory data, tower structural data, transport data, and power data; analyzing the site data in the site qualification database with the processing system to generate a plurality of site scores by differentially weighing different data types in the site data for each of the plurality of RF transmission sites, each of the plurality of site scores providing a viability metric for a corresponding one of the plurality of RF transmission sites; rating each of the plurality of RF transmission sites with the processing system based at least in part on the plurality of site scores by comparing each of the plurality of site scores to at least one threshold value; and performing an RF analysis to generate an RF network design utilizing the rating of each of the plurality of RF transmission sites to preferentially utilize RF transmission sites having a suitable site score by preferentially utilizing RF transmission towers having a site score above the at least one threshold value.

In another example embodiment, an apparatus is provided, the apparatus comprising: a processor; a memory coupled to the processor; and a program residing in the memory and being executed by the processor, the program including: a site data intake tool, the site data intake tool including an array of site data fields, the site data fields configured to receive site data from one or more radio frequency (RF) transmission site vendors such that the site data intake tool includes a plurality of site data elements corresponding to a group of RF transmission sites available from a corresponding RF transmission site vendor; a site qualification database on a processing system, the site qualification database updated to include the site data elements corresponding to the group of RF transmission sites available from the corresponding RF transmission site vendors such that the site qualification database includes site data for each of a plurality of RF transmission sites; a site viability program, the site viability program configured to analyze the site data in the site qualification database to generate a plurality of site scores, each of the plurality of site scores providing a viability metric for a corresponding one of the plurality of RF transmission sites, the site viability program further configured to rate each of the plurality of RF transmission sites based at least in part on the plurality of site scores for use in an RF analysis to generate an RF network design that preferentially utilizes RF transmission sites having a suitable site score.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments described herein provide systems, devices and/or methods to improve the design of radio frequency (RF) communication networks. Specifically, these various embodiments improve the likelihood of a successful RF network design by identifying and preferentially utilizing RF transmission sites having a relatively high probability of being successfully incorporated into the RF network. These various embodiments provide a site qualification database that includes site data for a plurality of RF transmission sites. When so implemented, the site qualification database is utilized to analyze the site data and generate a plurality of site scores, with each of the plurality of site scores providing a viability metric for the corresponding RF transmission site. The plurality of site scores is then utilized in rating each of the plurality of RF transmission sites. These ratings of the RF transmission sites are then utilized in an RF analysis. Specifically, an RF analysis is performed to generate an RF network design utilizing the ratings to preferentially utilize RF transmission sites having a suitable site score.

This process of utilizing a site qualification database to analyze and rate RF transmission sites, and then utilizing the ratings to preferentially utilize RF transmission sites having a suitable site score, can result in an increased likelihood of a successful RF network design and implementation. Furthermore, this process can reduce the costs of building such networks by focusing the RF network design on those sites that can be utilized relatively quickly and in some cases with lower costs.

In one example embodiment, a radio frequency (RF) network design method comprises: providing a site qualification database on a processing system, the site qualification database including site data for each of a plurality of RF transmission sites; analyzing the site data in the site qualification database to generate a plurality of site scores, each of the plurality of site scores providing a viability metric for a corresponding one of the plurality of RF transmission sites; rating each of the plurality of RF transmission sites based at least in part on the plurality of site scores; and performing an RF analysis to generate an RF network design utilizing the rating of each of the plurality of site scores to preferentially utilize RF transmission sites having a suitable site score.

The various embodiments described herein provide systems, devices and/or processes to improve the delivery of commercial content in a video streaming system. Specifically, the various embodiments provide an improved user interface for a video streaming system. In general, this user interface displays programming information to the user for a plurality of program channels and facilitates user selection of program channels for streaming.

Figure 1:
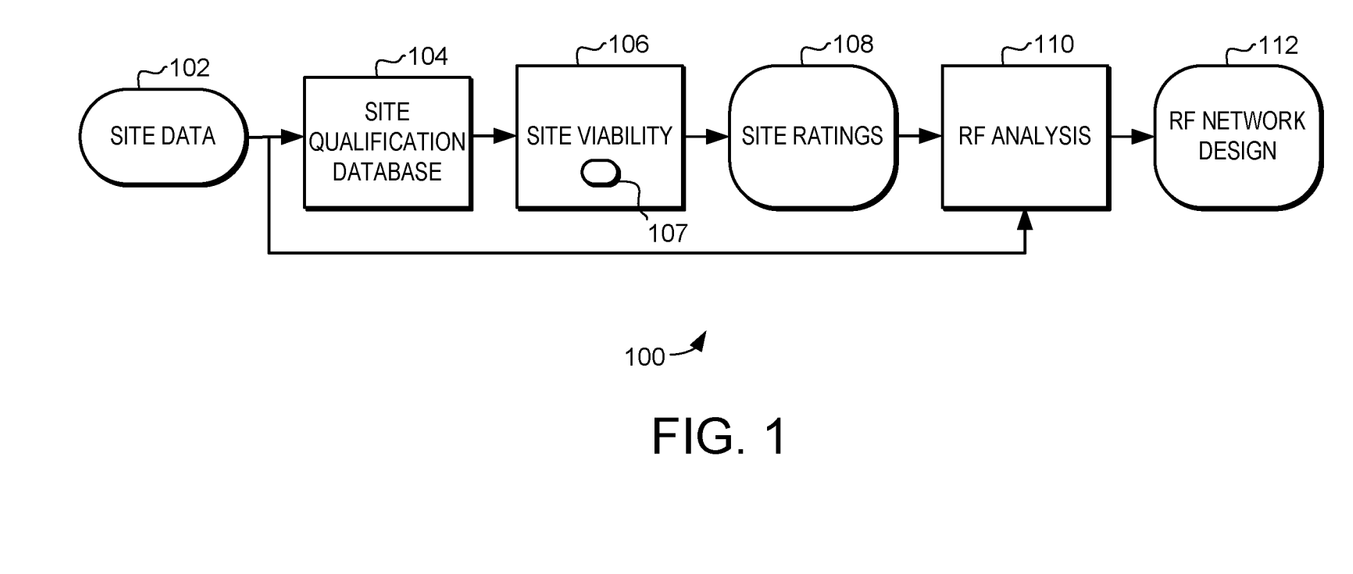
FIG. 1 is a diagram of an RF network design system in accordance with an embodiment.

Turning now to the drawings and with initial reference to FIG. 1, an RF network design system 100 is illustrated. The RF network design system 100 suitably includes a site qualification database 104, a site viability module 106, and an RF analysis module 110. In general, the site qualification database 104 receives and stores site data 102. The site viability module 106 uses the site qualification database 104 to generate a plurality of site ratings 108 for a plurality of RF transmission sites. Specifically, the site viability module 106 generates a plurality of site scores 107 using the site qualification database 104 and then generates a plurality of site ratings 108 based at least in part on the site scores 107. The RF analysis module 110 performs an RF analysis to generate an RF network design 112 utilizing the site ratings 108 to preferentially utilize RF transmission sites having a suitable site score. The use of a site qualification database 104 and site viability module 106 in the RF network design system 100 to analyze and rate RF transmission sites can provide an increased likelihood of a successful RF network design and implementation. Furthermore, this use of the RF network design system 100 can reduce the costs of building such networks by focusing the RF network design on those sites that can be utilized relatively quickly and in some cases with lower costs.

To facilitate this analysis a variety of different types of data can be used in the site qualification database 104. For example, in one embodiment, the site qualification database 104 includes tower structural data for the various RF transmission sites. In another embodiment, the site qualification database 104 can include elevation data for the various RF transmission sites. In another embodiment, the site qualification database 104 can include power data for the various RF transmission sites. In another embodiment, the site qualification database 104 can include transport data for the various RF transmission sites. In another embodiment, the site qualification database 104 can include location data for the various RF transmission sites. In another embodiment, the site qualification database 104 can include ownership data for the various RF transmission sites. These and other types of data that can be included in the site qualification database 104 will be described in greater detail below with reference to FIG. 2.

As described above, the site viability module 106 is implemented to generate a plurality of site scores 107 using the site qualification database 104 and generate a plurality of site ratings 108 based at least in part on the site scores 107. In one embodiment the site viability module 106 generates the plurality of site scores by differentially weighing different data elements or different data types in the site qualification database 104. For example, some data types (e.g., ownership data) can be weighted to treat with relatively high importance compared to other data types (e.g., power data) when generating site scores. Thus, relatively important features in the RF transmission sites can be weighted more heavily in the RF network design process.

The site ratings 108 can be likewise generated by the site viability module 106 using one or more threshold values. In one such embodiment, the site ratings of the plurality of RF transmission sites are based at least in part on comparing the each of the plurality of site scores to at least one threshold value. In another embodiment, the site ratings of each of the plurality of RF transmission sites is based at least in part on comparing the each of the plurality of site scores to at least a first threshold value and a second threshold value.

In such embodiments, the threshold values can be used to select RF transmission sites that are suitable for inclusion in the RF network. For example, the site rating of each of the plurality of RF transmission sites can be used by preferentially utilizing RF transmission sites having a site score beyond the first threshold value and then preferentially utilizing RF transmission sites having a site score between the first threshold value and the second threshold value as needed.

The RF network design system 100 can thus utilize the site qualification database 104 to analyze and rate RF transmission sites, and then utilize the site ratings 108 to preferentially utilize RF transmission sites having a suitable site score. This can result in an increased likelihood of a successful RF network design and implementation and can in some cases reduce the costs of building such networks.

In some embodiments a variety of different additional processes can be performed using the RF network design 112. For example, in some cases it may not be possible to implement the RF network design 112 using only high rated transmission sites (i.e., those transmission sites have a site score above a threshold value or in a certain range). In those cases it can become necessary to use lower rated RF transmission sites even with the higher difficulty associated with those sites. A detailed example of such techniques will be described below with reference to FIGS. 4-5.

A variety of different techniques and processes can be used to obtain the site data 102 used in the RF network design system 100. For example, the site data can be obtained from vendors, brokers or other parties with access to data for individual or groups of RF transmission sites. In one example, the site data can be obtained using a site data intake tool. A detailed example of such techniques will be described below with reference to FIGS. 5 and 6.

Figure 2:
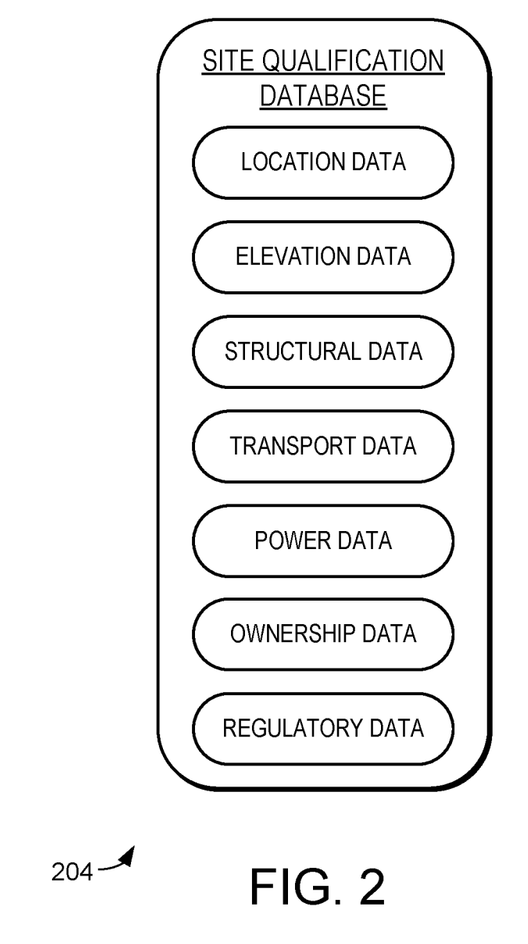
FIG. 2 is a schematic view of a RF site qualification database in accordance with an embodiment.

Turning now to FIG. 2, a graphical representation of one embodiment of a site qualification database 204 is illustrated. The site qualification database 204 is an example of the type of database that can be used with in an RF network design system (e.g., RF network design system 100). The site qualification database 204 in this illustrated embodiment includes location data, elevation data, structural data, transport data, power data, ownership data and regulatory data. So implemented, the site qualification database 204 can be used to generate site ratings for a plurality of corresponding RF transmission sites. Specifically, the site qualification database 204 can be used to generate a plurality of site scores, and then generate a plurality of site ratings using the site scores. These site ratings can then utilized in an RF analysis to generate an improved RF network design.

In general, the location data comprises data related to the location of an RF transmission site. This location data can be in the form of geographic coordinates (e.g., latitude/longitude as defined by the Universal Transverse Mercator (UTM) system) or other suitable format. For example, the coordinates 39.5678, −104.9261 indicate a site located in the Denver market.

In general, the elevation data comprises data related to the elevation of an RF transmission site. This elevation data can be form of elevation above sea-level or a relative elevation above a surrounding area. For example a site at 5658 above mean sea level (AMSL) has a ground elevation of 5,658 feet above mean sea level. A site at 57 feet above ground level (AGL) means the tower top is 57 feet above ground level.

In general, the structural data comprises data related to an existing structure on an RF transmission site. This structural data can include data relating to the height of the tower above ground. Furthermore, this structural data can include height data relating to any specifications sections of a tower that are available for additional antenna installation. As one example, the structural data can indicate that a tower extends 50 meters above ground and has available space from 35-40 meters above around for additional RF antennas.

The structure data can also include data relating to the load bearing capacity of the tower. This can include the total load bearing capacity and available capacity. For example, an existing tower may have a total load bearing capacity of 1000 kg, and an available load bearing capacity of 200 kg.

As a further example, the structural data can include results of the last structural analysis performed on the tower. As additional equipment is placed on the tower, it is generally a requirement of the overseeing jurisdiction that in order to obtain a building permit, the soundness of the structure must be proved. For example, an analysis by a licensed Professional Engineer may be required to determine the structure's fitness for use prior to the addition of any load that may compromise the structural integrity. Specifically, by obtaining the current % utilization rate on a scale of 0-100 the structure's ability to withstand the additional loading can be determined, prior to and without the cost of running a full structural analysis.

In general, the transport data comprises data related to internet connectivity at the RF transmission site. This transport data can describe both the existing data transport capability and the ability to add additional transport capability at the site. For example, the transport data can describe the data bandwidth of existing optical fiber networks at the site. As another example, the transport data can describe the data bandwidth of existing microwave transmission antennas at the site. The transport data can also include information regarding the ability to upgrade or add additional data bandwidth. For example, the transport data can include information regarding data transmission lines that are close to the site and would need to be extended to provide data transmission capability. This information can include the distance to the site and estimated costs to extend to the site.

As one detailed example, the transport data can describe an RF transmission site as currently having microwave transmission equipment and where optical fiber is currently 5 km away. In this case how close optical fiber is to the site can be crucial to analyzing the viability of the site, as a site where a high-speed fiber connection to the central network is either unavailable or cost-ineffective is likely to be unviable.

In general, the power data can comprise data related to the availability of electrical power at the RF transmission site. This can include data relating to existing electrical power supply lines that extend to the site, including the current amount of available electrical power at the site. As other examples this can include data related to existing power generation and battery storage at the site. Additionally, this can include data relating to the ability add additional power lines, additional power generating capability, and additional power storage.

In general, the ownership data can comprise data related to the owners and lessees of the land at the RF transmission site. This can include information regarding the owners and lessees of the any existing structures or underlying land. This can also include information regarding any existing easements or other encumbrances. This can also include information regarding the type of owner or lessee, such as are they individuals, trusts, corporations, or government entities.

In general, the regulatory data can comprise data relating to regulatory factors relevant to the RF transmission site. This can include data regarding land use regulations, including zoning limitations on structure size and placement at the RF transmission site. As a specific example, this data include limitations of tower height and the size of related buildings for the RF transmission site.

This regulatory data can also include data regarding environmental related regulations. For example, the regulatory data can include data relating to regulations protections for historic and cultural sites. As another example, the regulatory data can include data relating to migratory animals and endangered species protections.

So implemented the site qualification database 204 can be used with in an RF network design system (e.g., RF network design system 100) to generate site ratings for a plurality of corresponding RF transmission sites. Specifically, the site qualification database 204 can use the location data, elevation data, structural data, transport data, power data, ownership data and regulatory data to generate a plurality of site scores, and then generate a plurality of site ratings using the site scores. These site ratings can then utilized in an RF analysis to generate an improved RF network design.

Figure 3:
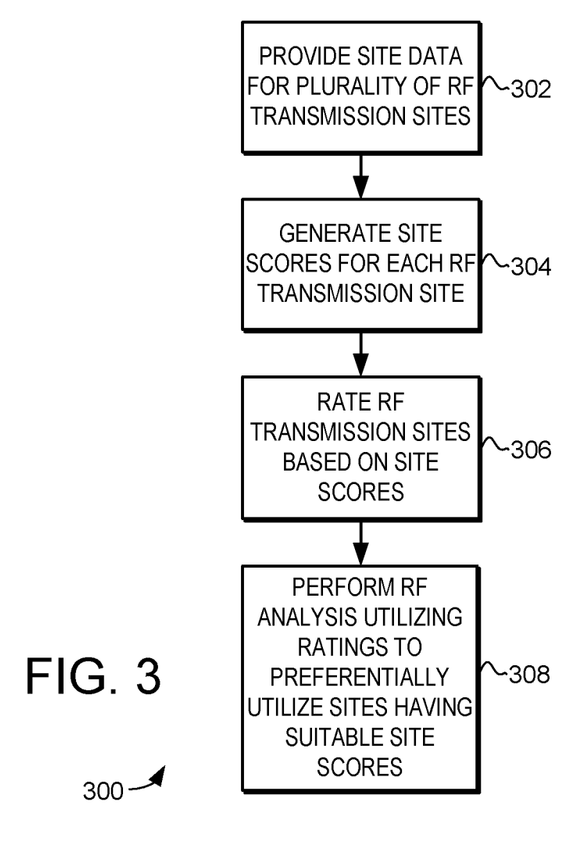
FIG. 3 is a flow diagram of an RF network design method in accordance with another embodiment.

Turning now to FIG. 3, an RF network design method 300 is illustrated. In general, the RF network design method 300 uses site data to generate a plurality of site ratings for a plurality of RF transmission sites, and then utilizes those site ratings in selecting RF transmission sites for incorporation into an RF network. As such, the RF network design method 300 is an example of the type of process that can be used by an RF network design system described above.

The first step 302 in method 300 is to provide site data for a plurality of RF transmission sites. As described above, this site data can include a variety of different types of data related to each potential RF transmission site. This site data can include various combinations of location data, elevation data, structural data, transport data, power data, ownership data and/or regulatory data for each RF transmission site under consideration in a geographical area. Such data would typically be received from a variety of sources. Some data may be provided from the owners of RF transmission sites, while other data may be obtained from various governmental and commercial sources. Finally, some site data can be generated by independent examination.

In one embodiment this provided site data is received from various sources and stored in suitable site qualification database (e.g., site qualification database 104, 204). A variety of suitable processing systems can be used to implement the site qualification database, including typical commercially available computing systems and database software products. In one specific example the site data is stored in a relational database. In another example the site data is stored in a spreadsheet database.

The next step 304 is to generate site scores for each RF transmission site using the site data. In a one typical implementation, one site score is generated for each RF transmission site, while in other implementations a plurality of site scores are generated for each RF transmission site.

A variety of different techniques can be used to generate these site scores using the site data. In one embodiment the site scores are generated by differentially weighing the different types of site data in the site qualification database. This allows relatively important site features to be weighted higher than relatively unimportant site features in generating the site scores. Specifically, this facilitates weighting site data elements or types related to relatively important site features (e.g., certain types of regulatory data, ownership data) higher than site data elements related to less important site features (e.g., certain types power data) when generating site scores. Thus, relatively important features in the RF transmission sites can be weighted more heavily in the RF network site selection and design process.

In one embodiment, some data elements or types may be converted to a numerical representation and applied to a weighting function. The weighting function can be configured to apply a different weighting factor to the data element that corresponds to the relative importance of the corresponding features. The outputs of the weighting functions can then be combined to generate a site score for the RF transmission site. In other embodiments, some data elements or types may be weighted separately or used as a threshold determining factor in generating site scores. In either case, the various data elements for each RF transmission site are used to generate a site score for the corresponding RF transmission site.

The next step 306 is to rate each of the plurality of RF transmission sites based at least in part on the generated site scores. In general, the rating of the RF transmission sites facilitates the categorization of the sites based on their relative suitability. A variety of different techniques can be used to generate the ratings from the site scores. For example, in one embodiment the site rating for each site can be compared to a threshold value. In such an embodiment those sites having a site rating beyond the threshold can be considered suitable for inclusion into the RF network, while those sites having a site rating not beyond the threshold are not so considered.

In other embodiments the site rating for each site is compared to multiple threshold values (e.g., a first threshold value and a second threshold value). These multiple threshold values can thus effectively be used to categorize sites based on their relative suitability. In such an embodiment those sites having a site rating beyond the first threshold can be considered most suitable for inclusion into the RF network. Likewise, those sites having a site rating between the first and second thresholds can be considered moderately suitable for inclusion into the RF network. Finally, sites not beyond the second threshold can be considered unsuitable for inclusion into the RF network. Such a technique can be expanded with more threshold values to facilitate increased granularity.

The next step 308 is to perform an RF analysis utilizing the site ratings to preferentially utilize those RF transmission sites having suitable site scores. In general, the goal of the RF analysis performed in step 308 is to generate an RF network design that provides a desired signal strength and coverage over a designated geographical or population coverage area. For example, in designing this network it may be desirable that each site cover exactly a specific desired area and not cover areas that are already covered by other sites. In step 308 this RF analysis is performed in way that uses the site ratings generated in step 306 in selecting RF transmission sites for possible inclusion into the RF network design meeting the design goals. This focuses the RF design process on those sites that have a better site score and thus are more likely to be successfully implemented into the RF network design. For example, by focusing the RF design process on those sites that are less likely to have transport, power, ownership or regulatory issues that may significantly impact the likelihood of a successful RF transmission site build.

In one embodiment, the site ratings of each of the plurality of RF transmission sites are used in the RF design process to preferentially select RF transmission sites having a site score beyond (e.g., above) a threshold value. Thus, the RF design process proceeds by attempting to design the RF network to have suitable signal strength and transmission capacity over a geographical area using only those sites that have a site score beyond the first threshold. Sites not beyond (e.g., below) the first threshold are not included in the initial RF network design process. Thus, the RF network is designed to provide suitable signal strength and coverage over designated geographical area using only those sites that are likely to not have significant transport, power, ownership or regulatory issues.

In another embodiment, the site ratings of each of the plurality of RF transmission sites are used in the RF design process to preferentially select RF transmission sites having a site score above the first threshold value and then preferentially utilizing RF transmission sites having a site score between the first and second thresholds. Such a technique can be expanded with more threshold values to facilitate increased granularity.

The method 300 of using site data in a site qualification database to analyze and rate RF transmission sites, and then utilizing the ratings to preferentially utilize RF transmission sites having a suitable site score, can result in an increased likelihood of a successful RF network design and implementation. Furthermore, this process can reduce the costs of building such networks by focusing the RF network design on those sites that can be utilized relatively quickly and in some cases with lower costs.

In some embodiments a variety of different additional processes can be performed using the generated RF network design 112. For example, in some cases it may not be possible to fully implement the RF network design 112 with the desired coverage and capacity using only high rated transmission sites (i.e., those transmission sites have a site score above a threshold value or in a certain range). In those cases it can become necessary to use some lower rated RF transmission sites even with the higher difficulty associated with those sites. Additionally, in some cases it may be also needed to use some sites not found the qualification database.

Figure 4:
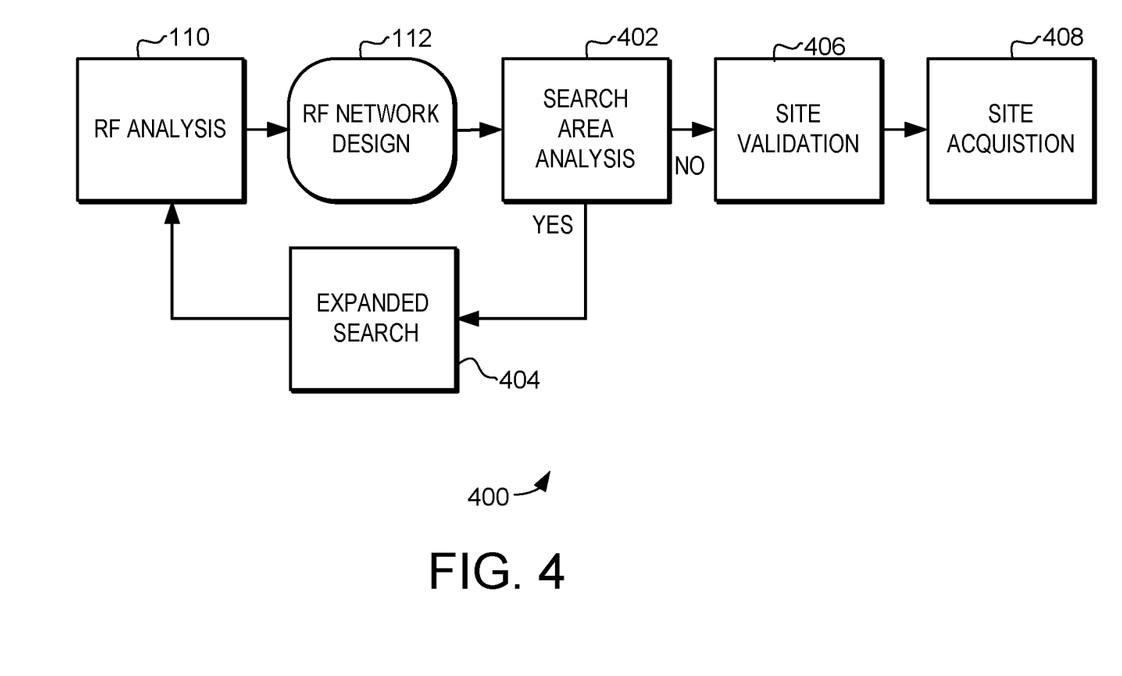
FIG. 4 is a diagram of an RF network design system in accordance with an embodiment.

Turning now to FIG. 4, such further embodiment of an RF network design system 400 is illustrated. In this further embodiment, a search area module 402 is performed on the generated RF network design 112 to determine if there are areas without sufficient RF signal coverage. Again, this can occur when there were no highly rated RF transmission sites in a certain geographical area, resulting in a coverage "hole" in the RF network design 112. In such a situation a search area module 402 of the RF network design 112 can identify one or more search rings that correspond to areas in which additional RF transmission sites are needed to provide desired coverage and network capacity.

When one or more search rings or other areas are found that do not have sufficient coverage an expanded search 404 is performed. In some cases this expanded search can utilize the site qualification database (e.g., site qualification database 104) to search RF transmission sites that have relatively lower site scores and thus were previously excluded from consideration in the generating of the RF network design 112. Alternatively, in some embodiments other potential RF transmission sites not in the site qualification database can be analyzed in the expanded search 404.

When utilizing the site qualification database in the expanded search 404 the RF transmission sites in the site qualification database with relatively lower site scores are considered for incorporation into the RF network design. For example, RF transmission sites having a site rating between the second and third threshold values can be used, when before only sites with site ratings above the second threshold were used. Thus, the search area module 402 locates these lower rated sites, and the RF analysis module 110 is again performed to determine suitability for inclusion into the RF network design 112. This process can be continued until there are no coverage gaps or additional search rings in the RF network design 112.

With the RF network design completed, a site validation 406 can be performed. In some embodiments only sites with a site score below a certain threshold are required to be validated, while others can be assumed valid. In those cases the site validation 406 can be implemented to confirm that each of these selected RF transmission sites with low site scores includes specific needed features. For example, by requiring the contacting of the owner or lessor of such sites for individual confirmation of the status and features of the site. With the selected sites validated the process moves to site acquisition 408. In site acquisition 408 the process for acquiring site permissions to implement the RF transmission sites is started.

Figure 5:
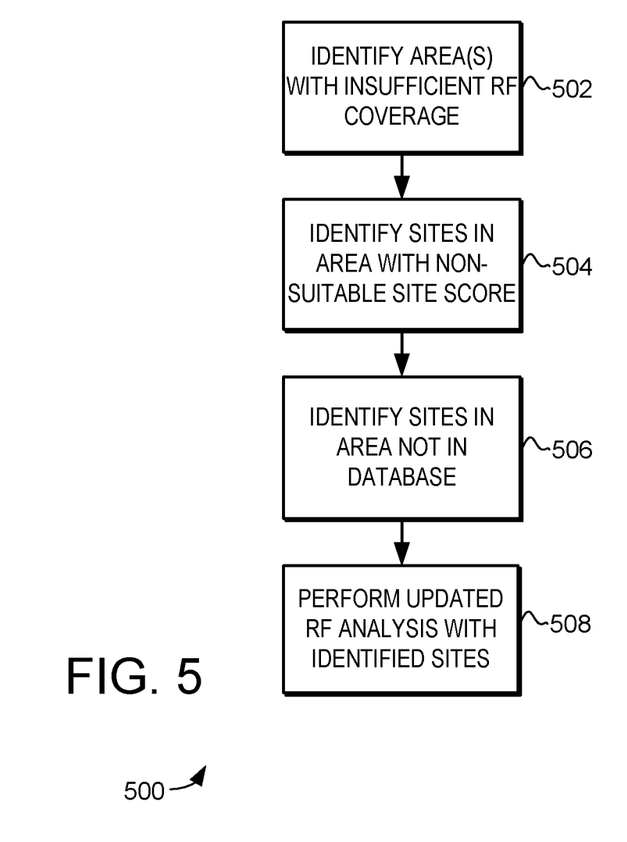
FIG. 5 is a flow diagram illustrating an RF network design method in accordance with an embodiment.

Turning now to FIG. 5, an RF network design method 500 is illustrated. In general, the RF network design method 500 examines a previous RF network design (e.g., RF network design 112) and determines if one or more areas within the design area will likely have insufficient RF coverage. For those areas with insufficient coverage the RF network design method 500 performs expanded searches for additional RF transmission sites. As will be described below, these expanded searches can include sites with non-suitable site scores and sites not found in the database of RF transmission sites. As such, these expanded searches can identify additional transmission sites that may be used to fill in the gaps in RF coverage and increase network capacity.

The first step 502 in method 500 is to identify areas with insufficient RF coverage in the RF network design. In a typical embodiment this step can be performed by an RF network design program (e.g., RF analysis module 110) which evaluates the current RF network design to determine what areas would have insufficient coverage. For example, the RF network design program can determine what coverage areas are likely to have insufficient RF signal strength and/or have insufficient RF network capacity. In either case this step 502 identifies areas for which additional RF transmission sites are needed to complete the RF network with the desired coverage and capacity. As one example, the analysis in step 502 can generate one or more "search rings" that each describes an area in which additional RF transmission site are needed for the network. In this case each search ring is geographic description of the area in which additional RF transmission facilities are needed to provide the desired RF coverage.

The next step 504 is to identify transmission sites in the identified area having non-suitable site scores. In general, this step identifies potential sites that were not included in the original RF network design process but that may be used to increase coverage in the identified areas with insufficient RF coverage. This step uses the site qualification database (e.g., site qualification database 104, 204) to search for potential RF transmission sites in the search area, while expanding the criteria to include transmission sites that were previously excluded from inclusion in the network design. For example, this step can include the identification of RF transmission sites in the search area that had site scores below the threshold level used previously to identify suitable sites. Stated another way, this step can be used identify potential sites in the search area that were excluded from consideration based on their site score in the previous network design process.

In other embodiments this can be accomplished by providing for the manual overriding of relatively low site scores given to certain RF transmission sites. This again allows sites to be considered that were previously excluded from consideration in the network design process based on their low site scores.

The next step 506 is to identify transmission sites in the identified area not included in the site qualification database. In general, this step identifies potential sites that were not included in the site qualification database but that may be used to increase coverage in areas with insufficient RF coverage. Because this step uses sites that were not included in the site qualification database (e.g., site qualification database 104, 204), this step further expands the search for potential sites beyond those available in the previous step.

A variety of different sources can be used to identify potential sites in this step. For example, this step can include the identification of RF transmission sites using mapping data. This mapping data can be provided in a variety of formats and system. Furthermore, this mapping data can include data from a variety of sources, including commercial and government sources. In one specific example, the mapping data is provided in a geographic information system (GIS). The GIS can include information about many different types of potential RF transmission sites, including towers, billboards and building rooftops. Again, such mapping data can come from a variety of sources. Such mapping data can also include data regarding raw land that may be suitable for a new transmission facility. In each case, the step identifies potential RF transmission sites that were excluded from the site qualification database and thus from consideration in the previous network design process.

The next step 508 is to perform an updated RF analysis utilizing the identified sites. In general, the goal of the RF analysis performed in step 508 is to generate an updated RF network design that fills the coverage gaps in the previous design. Thus, the updated design provides the desired signal strength and network capacity over the designated geographical or population coverage area.

Figure 6:
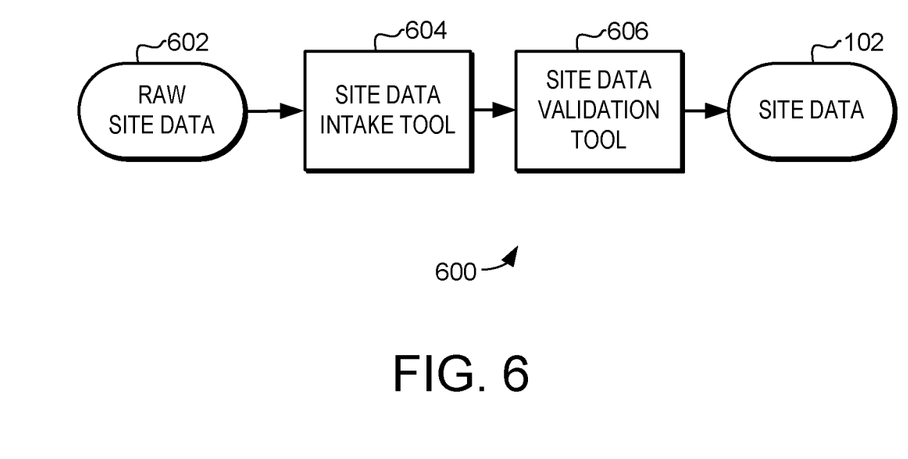
FIG. 6 is a diagram of an RF network design system in accordance with an embodiment.

A variety of different techniques and processes can be used to obtain the site data 102 used in the RF network design system 100. For example, the site data can be obtained from vendors, brokers or other parties with access to data for individual or groups of RF transmission sites. Turning now to FIG. 6, an embodiment of an RF network design system 600 includes a site data intake tool 604 and a site data validation tool 606 used to facilitate the obtaining of site data for a site qualification database.

In general, the site data intake tool 604 drives data collection and enforces data requirements and standards for the site data that is collected. To facilitate this, the site data intake tool 604 defines the data types and data formats needed for each RF transmission site. The site data intake tool 604 is provided to RF transmission site vendors and the vendors can then enter the described data in the correct format and type for each RF transmission site in the vendor's inventory. In one example embodiment, the site data intake tool 604 includes a plurality of data fields for each RF transmission site. The site data intake tool 604 can also include descriptors of the data needed for each field to inform the vendors of the requirements for each field. As such, the vendors can enter the appropriate data into each data field for each of their RF transmission sites.

For example, the site data intake tool 604 can include data fields relating to corresponding data types in the site qualification database. As specific examples, the site data intake tool 604 can include data fields corresponding to location data, elevation data, structural data, transport data, power data, ownership data and regulatory data as described with reference to FIG. 2. In one embodiment the site data intake tool 604 can be implemented as a spreadsheet with a plurality of fields that describe the data requirements and rating criteria for each data type. In other embodiments the site data intake tool 604 can be implemented as internet interface where vendors can enter data into the plurality of data fields using web browser or other suitable internet enabled device.

For example, the site data intake tool 604 can include data fields describing available centerlines, open radiation centers, asset classes, above ground locations, available shelter, if landlord consent is required, available power at site, utility easements, etc. As one specific example, the centerline can be defined as an above ground level (AGL) that defines the midpoint of where an antenna is to be mounted. The site data intake tool 604 can be implemented to enforce data type and range for this type of site data. As another example, the site data intake tool 604 can enforce the data type and range for the latitude/longitude describing the specification location of the site. As another example, the site data intake tool 604 can enforce the data type for the zoning issues related to the site.

Then, in general, the site data intake tool 604 passes site data 602 to the site data validation tool 606. The site data validation tool 606 then checks the site data for completeness and form. For example, site data validation tool 606 can be used to ensure that each data element is the correct type (e.g., location data, height data, etc.) and is within an expected range of values. Additionally, a unique ID can be assigned to each RF transmission site.

In one embodiment a different site data intake tool 604 and data validation tool can be implemented for each different type of RF transmission site. For example, different site data intake tools can be implemented for traditional telecom RF towers, utility towers, rooftops, billboards, water tanks and raw land.

Figure 7:
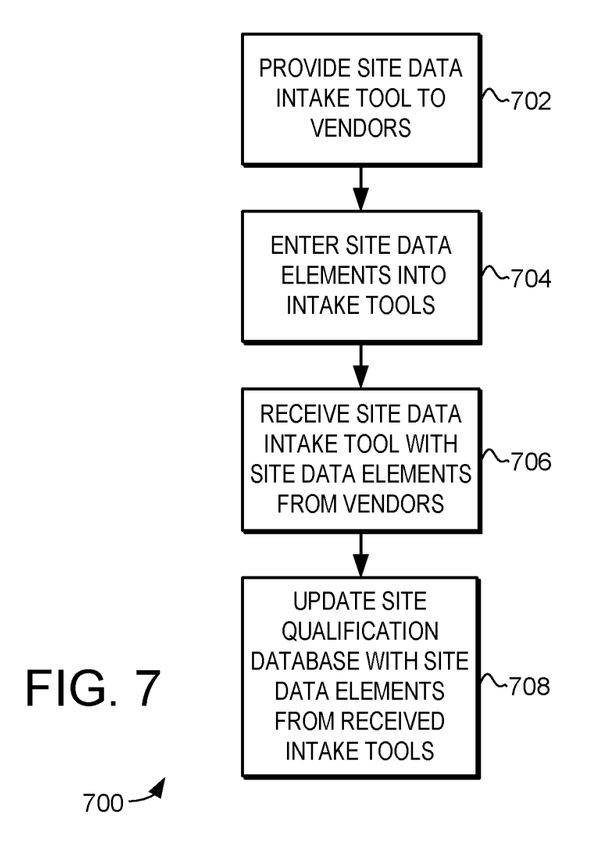
FIG. 7 is a flow diagram illustrating an RF network design method in accordance with an embodiment.

Turning now to FIG. 7, an RF network design method 700 is illustrated. In general, the RF network design method 700 facilitates the obtaining of site data for the site qualification database (e.g., site qualification database 104, 204). This is facilitated through the use of a site data intake tool (e.g., site data intake tool 604). In general, the method 700 drives data collection and enforces data requirements and standards for the site data that is obtained for addition to the site qualification database.

The first step 702 in method 700 is to provide a site data intake tool to one or more RF transmission site vendors. As described above, the site data intake tool defines the data types and data formats needed for each RF transmission site. In step 702 the site data intake tool is provided to vendors to facilitate the entry of site data in the correct format and type for each RF transmission site in the vendor's inventory. As one example, the site data intake tool includes a plurality of data fields for each RF transmission site, including data fields relating to corresponding data types in the site qualification database (e.g., fields for corresponding to location data, elevation data, structural data, etc.). The data intake tool can also include descriptors of the data types needed for each field to inform the vendors of the requirements for each field.

The next step 704 is to enter site data elements into the intake tools. In this the vendor enters the appropriate data elements into each data field for each of their RF transmission sites. Again, as examples this can be done through a spreadsheet program or suitable internet interface. And as described, the site data intake tool can be implemented to enforce data type and range for each type of site data. Thus, when performing step 704 a vendor can be prevented from entering data into the data fields in the wrong formats or range.

The next step 706 is to receive the site data intake tool from the transmission site vendors and in step 708 the site qualification database is updated with the new site data elements. In these steps the newly received site data elements are transferred to the site qualification database, thus adding the information for the new RF transmission sites to the database. This transfer and updating the site qualification database can be performed using any suitable technique.

With the site qualification database updated it can be used for RF network design. For example, the RF network design method 300 described above can be performed using the updated qualification database. In this process the updated qualification database is used to generate a plurality of site ratings for a plurality of RF transmission sites, and then those site ratings are used in selecting RF transmission sites for incorporation into an RF network. Such a process can result in an increased likelihood of a successful RF network design and implementation. Furthermore, such a process can reduce the costs of building such networks by focusing the RF network design on those sites that can be utilized relatively quickly and in some cases with lower costs.

Figure 8:
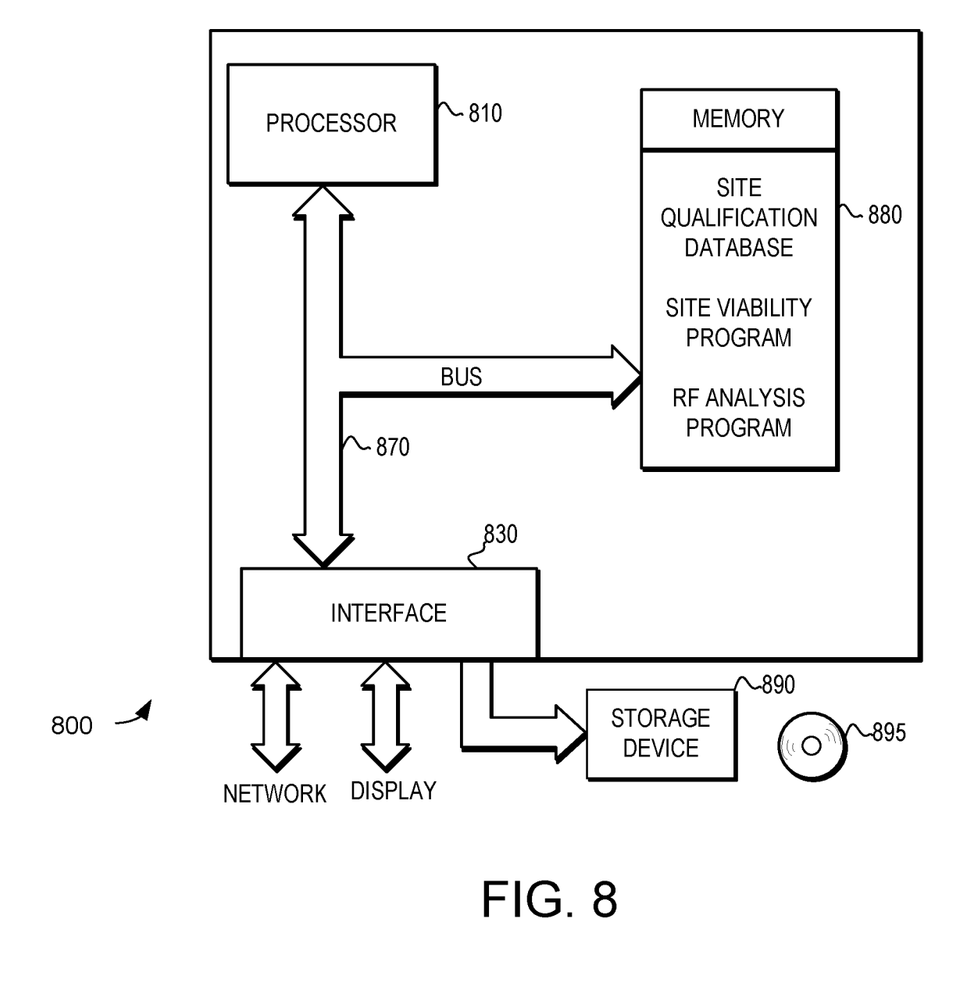
FIG. 8 is a schematic diagram of a processing system in accordance with another embodiment.

Turning now to FIG. 8, an exemplary processing system 800 is illustrated. Processing system 800 illustrates the general features of a processing system that can be used to implement the various embodiments described above. Of course, these features are merely exemplary, and it should be understood that the invention can be implemented using different types of hardware that can include more or different features. It should be noted that the processing system 800 can be implemented in many different environments, such as part of large networked computer system that spans multiple sites or as discrete individual computer system. The exemplary processing system 800 includes a processor 810, an interface 830, a storage device 890, a bus 870 and a memory 880. In accordance with the embodiments of the invention, the memory 880 includes at least a site qualification database, a site viability analysis program and an RF analysis program. As such, the system 800 is an example of the type of system that can implement the RF network design method 300 described above.

In general, the processor 810 performs the computation and control functions of the system 800. The processor 810 may comprise any type of processor, include single integrated circuits such as a microprocessor, or may comprise any suitable number of integrated circuit devices and/or circuit boards working in cooperation to accomplish the functions of a processing unit. In addition, processor 810 may comprise multiple processors implemented on separate systems. In addition, the processor 810 may be part of an overall larger computer system. During operation, the processor 810 executes the programs contained within memory 880 and as such, controls the general operation of the processing system 800.

Memory 880 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 880 may be a single type of memory component, or it may be composed of many different types of memory components. In addition, the memory 880 and the processor 810 may be distributed across several different physical devices that collectively processing system 800. For example, a portion of memory 880 may reside on one computer system, and another portion may reside on a second computer system.

The bus 870 serves to transmit programs, data, status and other information or signals between the various components of processing system 800. The bus 870 can be any suitable physical or logical means of connecting computer systems and components. This includes, but is not limited to, direct hard-wired connections, fiber optics, infrared and wireless bus technologies. It should also be noted that the processing system 800 could be implemented as a single system on a chip (SoC). In such a case the bus 870 can comprise the internal bus of the SoC.

The interface 830 allows communication to the processing system 800, and can be implemented using any suitable method and apparatus. It can include a network interfaces to communicate to other systems such as vendors and other providers of RF transmission site data and, terminal interfaces to communicate with technicians, and storage interfaces to connect to storage apparatuses such as storage device 890. Storage device 890 can be any suitable type of storage apparatus, including direct access storage devices such as hard disk drives, flash drives, non-volatile memory cards and optical disk drives. As shown in FIG. 8, storage device 890 can comprise a disc drive device that uses discs 895 to store data, but again, this is just one example.

In accordance with the embodiments described herein, the processing system 800 implements an RF network design system (e.g., RF network design system 100, 400, 600). This RF network design system uses the site qualification database, site viability program and RF analysis program to generate an RF network design using the techniques described above.

It should be understood that while FIG. 8 is described here in the context of a fully functioning computer system, those skilled in the art will recognize that the mechanisms described herein of the present invention are capable of being distributed as a program product on recordable media in a variety of forms, and that the embodiments described herein apply equally regardless of the particular type of recordable media used to carry out the distribution. Examples of recordable media include: magnetic disks, flash memory devices, hard drives, memory cards and optical disks (e.g., disc 895).

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

The forgoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

What is claimed is:

1. A radio frequency (RF) network design method, the RF network design method comprising:
providing a site data intake tool to one or more RF transmission site vendors, the site data intake tool including a plurality of site data fields for receiving a plurality of site data elements, wherein each plurality of site data elements corresponds to one of a group of RF transmission sites available from a corresponding RF transmission site vendor;
receiving the site data intake tool from the one or more RF transmission site vendors, each received site data intake tool including the plurality of site data elements;
updating a site qualification database on a processing system with the received site data intake tools such that the site qualification database includes the plurality of site data elements for each of the RF transmission sites in the one or more groups of RF transmission sites;
analyzing the site data elements in the site qualification database to generate a plurality of site scores, wherein each site score corresponds to one of the RF transmission sites in the one or more groups of RF transmission sites; and
generating an RF network design by performing an RF analysis based on the site score of each of the RF transmission sites to preferentially utilize RF transmission sites having a suitable site score.

2. The RF network design method of claim 1, wherein the site data fields include a field for at least one selected from the group of ownership data, regulatory data, tower structural data, transport data, and power data.

3. The RF network design method of claim 1, wherein the providing a site data intake tool to one or more RF transmission site vendors comprises providing a separate site data intake tool for transmission towers and rooftop transmission sites.

4. The RF network design method of claim 1, wherein the site data intake tool validates site data elements entered by an RF transmission site vendor by at least one selected from the group of enforcing predetermined data types on the site data elements and enforcing predetermined data ranges on the site data elements.

5. The RF network design method of claim 1, wherein the analyzing the site data elements in the site qualification database to generate the plurality of site scores comprises differentially weighing different data types in the site data elements for each of the plurality of RF transmission sites.

6. The RF network design method of claim 5, wherein differentially weighing different data types in the site data elements comprises first converting at least some of the data elements to a numerical representation.

7. The RF network design method of claim 5, wherein differentially weighing different data types in the site data elements comprises applying a plurality of different weighing factors to the site data elements, wherein each weighing factor corresponds to a relative importance of the corresponding site data field.

8. The RF network design method of claim 7, wherein generating each site score comprises combining the output of the application of the weighing factors to the site data elements for each RF transmission site.

9. The RF network design method of claim 1, wherein preferentially utilizing RF transmission sites having a suitable site score comprises preferentially utilizing RF transmission sites having a site score beyond a first threshold value.

10. The RF network design method of claim 1, wherein preferentially utilizing RF transmission sites having a suitable site score comprises comparing each of the site scores to a first threshold value and a second threshold value and wherein the performing an RF analysis comprises preferentially utilizing RF transmission sites having a site score beyond the first threshold value and then utilizing RF transmission sites having a site score between the first threshold value and the second threshold value as needed.

11. A radio frequency (RF) network design system comprising a processor and a memory, wherein the RF network design system performs operations in response to the processor executing instruction stored in the memory, the operations comprising:
providing a site data intake tool to one or more RF transmission site vendors, the site data intake tool including a plurality of site data fields for receiving a plurality of site data elements, wherein each plurality of site data elements corresponds to one of a group of RF transmission sites available from a corresponding RF transmission site vendor;
receiving the site data intake tool from the one or more RF transmission site vendors, each received site data intake tool including the plurality of site data elements;
updating a site qualification database in the memory with the received site data intake tools such that the site qualification database includes the plurality of site data elements for each of the RF transmission sites in the one or more groups of RF transmission sites;
analyzing, by the RF network design system, the site data elements in the site qualification database to generate a plurality of site scores, wherein each site score corresponds to one of the RF transmission sites in the one or more groups of RF transmission sites; and
generating, by the RF network design system, an RF network design by performing an RF analysis based on the site score of each of the RF transmission sites to preferentially utilize RF transmission sites having a suitable site score.

12. The RF network design system of claim 10, wherein the site data fields include a field for at least one selected from the group of ownership data, regulatory data, tower structural data, transport data, and power data.

13. The RF network design system of claim 10, wherein the analyzing the site data elements in the site qualification database to generate the plurality of site scores comprises differentially weighing different data types in the site data elements for each of the plurality of RF transmission sites.

14. The RF network design system of claim 13, wherein differentially weighing different data types in the site data elements comprises applying a plurality of different weighing factors to the site data elements, wherein each weighing factor corresponds to a relative importance of the corresponding site data field.

15. The RF network design system of claim 10, wherein preferentially utilizing RF transmission sites having a suitable site score comprises preferentially utilizing RF transmission sites having a site score beyond a first threshold value.

16. An apparatus comprising:
a processor;
a memory coupled to the processor; and
a program residing in the memory and being executed by the processor, the program including:
a site data intake tool, the site data intake tool including a plurality of site data fields, the plurality of site data fields configured to receive a plurality of site data elements from one or more radio frequency (RF) transmission site vendors, wherein each plurality of site data elements corresponds to one of a group of RF transmission sites available from a corresponding RF transmission site vendor;
a site qualification database, the site qualification database updated to include the received site data elements corresponding to the group of RF transmission sites available from the corresponding one or more RF transmission site vendors such that the site qualification database includes the plurality of site data elements for each of the RF transmission sites in the one or more groups of RF transmission sites; and
a site viability program, the site viability program configured to analyze the site data elements in the site qualification database to generate a plurality of site scores, wherein each site score corresponds to one of the RF transmission sites in the one or more groups of RF transmission sites, the site viability program further configured generate an RF network design by performing an RF analysis based on the site score of each of the RF transmission sites to preferentially utilize RF transmission sites having a suitable site score.

17. The apparatus of claim 16, wherein the site data fields include a field for at least one selected from the group of ownership data, regulatory data, tower structural data, transport data, and power data.

18. The apparatus of claim 16, wherein the site viability program is configured to analyze the site data elements in the site qualification database to generate the plurality of site scores by differentially weighing different data types in the site data elements for each of the plurality of RF transmission sites.

19. The apparatus of claim 18, wherein differentially weighing different data types in the site data elements comprises applying a plurality of different weighing factors to the site data elements, wherein each weighing factor corresponds to a relative importance of the corresponding site data field.

20. The apparatus of claim 16, wherein preferentially utilizing RF transmission sites having a suitable site score comprises preferentially utilizing RF transmission sites having a site score beyond a first threshold value.

\* \* \* \* \*